Dec. 23, 1930.   D. D. DICKINSON   1,786,194
HARROW
Filed July 6, 1929   2 Sheets-Sheet 2
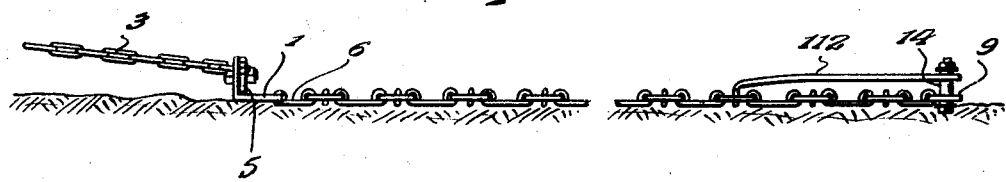
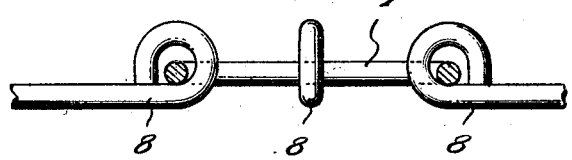
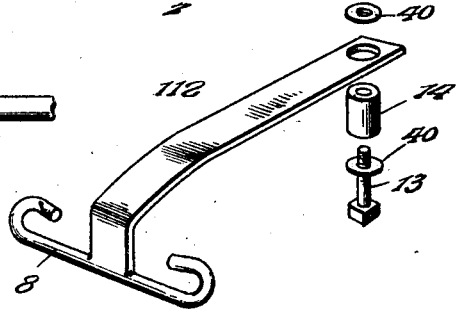
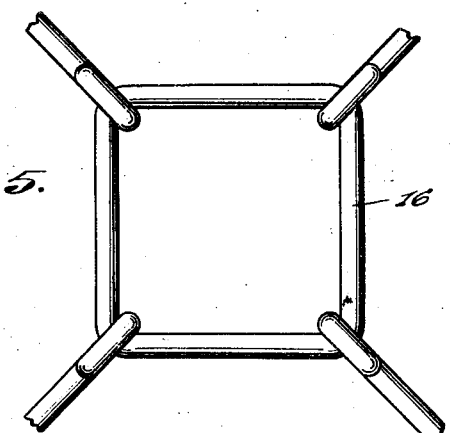
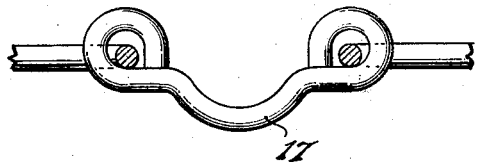
Inventor
D. D. Dickinson.
By Lacey & Lacey, Attorneys Patented Dec. 23, 1930

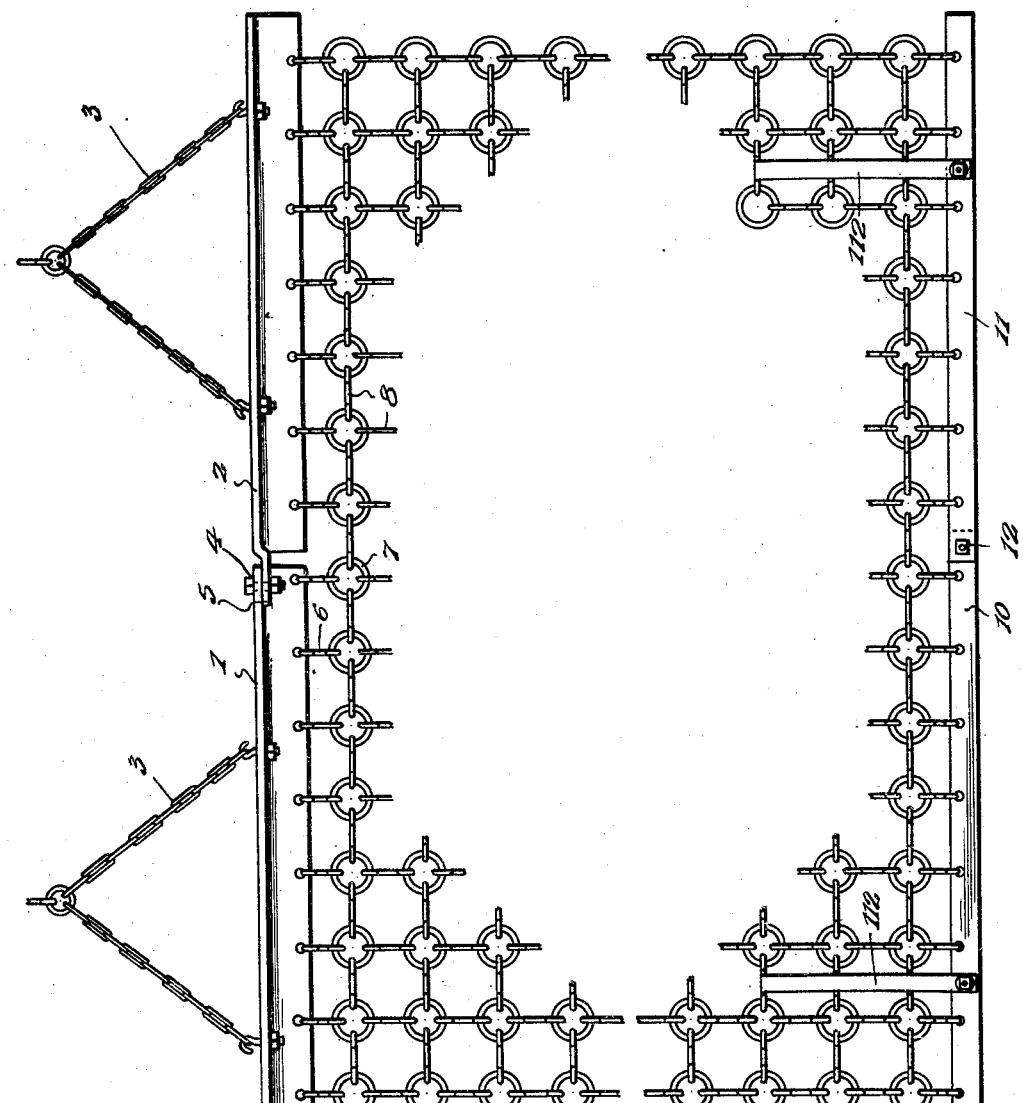

1,786,194

UNITED STATES PATENT OFFICE

DEAN D. DICKINSON, OF AYR, NORTH DAKOTA

HARROW

Application filed July 6, 1929. Serial No. 376,432.

This invention relates to tilling implements and has special reference to implements for reducing the surface of a field to a level condition and pulverizing all clods and removing or destroying the roots of grass and other undesirable growths. A particular object of the invention is to provide a drag which will be highly flexible to conform to the surface of the ground and will be also adapted to avoid total collapse while in use. The invention is illustrated in the accompanying drawings and will be hereinafter fully set forth.

In the drawings:

Figure 1 is a plan view of a harrow or drag embodying the invention,

Fig. 2 is an edge elevation of the same,

Fig. 3 is an enlarged detail section showing the connection between the rings and links, Fig. 4 is a detail perspective view of a stabilizer, Fig. 5 is a detail plan view showing a modification, and Fig. 6 is a detail section showing another modification.

In carrying out the invention, there is provided a draft beam or evener consisting of two angle bars 1 and 2 to which are attached draft chains 3 whereby draft may be applied to the implement from a tractor or by draft animals. The bars 1 and 2 are pivotally connected, as indicated at 4, the bar 2 having a projecting tongue 5 which is offset vertically to overlap the adjacent end of the bar 1 and thereby permit a limited movement of the bars to accommodate inequalities in the application of the draft while at the same time maintaining the bars in such relation that complete collapse of the beam cannot occur. Attached to the evener are a plurality of links 6 and engaged with the rear ends of said links are rings 7, other links 8 of the same construction as the links 6 being engaged with the rings and the arrangement being multiplied to any extent desired so that a drag surface will be provided consisting of rings and links coupling the adjacent rings. As will be understood most clearly upon reference to Fig. 3, the rings are continuous integral structures and the links are formed from preferably straight bars having their ends bent around the body of each engaged ring and then forged down onto the main length of the link so that the ring will be firmly secured, this same method of assembling being followed in connecting the front links with the drag beam.

The rearmost series of links are connected to a spreader bar consisting of sections 10 and 11 which are formed of flat bars having their meeting ends overlapped and pivotally connected, as shown at 12, whereby the device may be folded into a very small compass when not in use while at the same time the bar will be maintained in practically rigid position while the tool is in use. Adjacent the ends of the spreader bar are secured stabilizers 112 each consisting of a flat bar having its rear end secured to the spreader bar and its front end welded to one of the links 8 between the ends of the link so that the stabilizers will exert a downward pressure upon th adjacent portions of the chains to hold the links and rings to the ground and maintain the implement in its spread condition. To connect the rear ends of the stabilizers with the spreader bar, a bolt 13 is inserted upwardly through the spreader bar and through a sleeve 14 arranged between the bar and the end of the stabilizer, the bolt then passing through the end of the stabilizer and receiving a securing nut 15. The sleeve 14 passes loosely through an opening in the stabilizer bar and washers 40 are interposed between the ends of the sleeve and the securing nut and bolt head, respectively, so that the parts will be firmly connected but will have play sufficient to maintain the desired flexibility in the harrow.

Most generally, the chain which constitutes the greater portion of the implement will consist of round rings and links having their greater portions straight and lying in one plane. The rings, however, may be rectangular, as shown at 16 in Fig. 5, with the links engaging the respective corners of the rings and being thereby held against movement along the sides of the ring. Moreover, the links, as shown most clearly in Fig. 6, may have their intermediate portions arched, as shown at 17, whereby to increase the surface which will form active contact with the surface of the ground.

The device is intended for use more particularly upon ground which has been harrowed and in which roots have been dug up and left upon the surface. The implement is then drawn over the field in the usual manner of cultivating and inasmuch as the working area of the implement is composed of chains and is highly flexible, it will rest directly upon the ground surface and cling closely to the earth so that as it progresses it will reduce to a level the high portions of the turned soil and will engage the up-lifted roots so that they will be rolled over and over with the result that the sand and other dirt clinging thereto will be shaken therefrom. When the roots and grass and weeds have been in this manner freed of the loose soil, they may be easily removed either by hand or by the use of an ordinary rake.

Having thus described the invention, I claim:

1. An implement of the character specified comprising front and rear bars, a flexible member between and connecting said bars and consisting of interlooped rings and links, bars rigidly connected at their front ends to certain elements of the flexible member and extending rearwardly over the flexible member and having loose connection at their rear ends with the said rear bar.

2. An implement of the character specified comprising a draft bar, a drag bar, a flexible member between and connecting the draft and drag bars, longitudinal bars extending over the rear portion of the flexible member and rigidly connected to certain elements thereof at their front ends, and having openings in their rear ends which terminate in line with the drag bar, and elements projecting vertically from the drag bar and passing loosely through the openings of the longitudinal bars in which they have a limited play.

In testimony whereof I affix my signature.

DEAN D. DICKINSON. [L. S.]